United States Patent [19]
Hammond et al.

[11] Patent Number: 6,122,963
[45] Date of Patent: Sep. 26, 2000

[54] ELECTRONIC COMPONENT FOR MEASURING ACCELERATION

[75] Inventors: Jonathan H. Hammond, Scottsdale; Daniel N. Koury, Jr., Mesa; Richard J. August; Andrew C. McNeil, both of Scottsdale, all of Ariz.

[73] Assignee: Motorola, Inc., Schaumburg, Ill.

[21] Appl. No.: 09/235,731

[22] Filed: Jan. 22, 1999

[51] Int. Cl.⁷ .................................................. G01P 15/125
[52] U.S. Cl. ........................................ 73/514.32; 361/280
[58] Field of Search ............................ 73/514.32, 514.36, 73/514.37, 514.38, 514.21, 514.23, 514.24; 361/280, 283.1, 283.3

[56] References Cited

U.S. PATENT DOCUMENTS

| | | | |
|---|---|---|---|
| 5,233,213 | 8/1993 | Marek | 257/415 |
| 5,487,305 | 1/1996 | Ristic et al. | 73/514.32 |
| 5,551,293 | 9/1996 | Boysel et al. | 73/514.14 |
| 5,605,598 | 2/1997 | Greiff | 156/630.1 |
| 5,635,640 | 6/1997 | Geen | 73/504.12 |
| 5,665,915 | 9/1997 | Kobayashi et al. | 73/514.32 |
| 5,760,305 | 6/1998 | Greiff | 73/514.15 |

OTHER PUBLICATIONS

H. Dudaicevs et al., *Sensors and Actuators,* "Surface Micromachined Pressure Sensors with Integrated CMOS Read-Out Electronics", A43 (1994), pp. 157–163.

M. Mehregany et al., *Sensors and Actuators,* "A Study of Three Microfabricated Variable–Capacitance Motors", A21–A23 (1990), pp. 173–179.

*Primary Examiner*—John E. Chapman
*Attorney, Agent, or Firm*—A. Kate Huffman

[57] ABSTRACT

An electronic component includes a support substrate (101), a fixed electrode (113) overlying the support substrate (101), a movable electrode (123, 423) overlying the support substrate and the first electrode (113) wherein the first and second electrodes (113, 123, and 423) form a capacitor with a sensing area, an anchor (122, 422) coupled to the support substrate (101), and beams (125, 425) coupling different attachment points (129) of the second electrode (123, 423) to the anchor (122, 422) wherein the different attachment points (129) form a simply connected polygon and wherein a portion of the sensing area is located within the simply connected polygon.

17 Claims, 3 Drawing Sheets

ELECTRONIC COMPONENT FOR MEASURING ACCELERATION

BACKGROUND OF THE INVENTION

This invention relates, in general, to electronic components, and more particularly, to sensors.

Mechanical transducers can be micromachined from layers of polysilicon. Some transducers have three overlying layers of polysilicon where the middle layer is movable relative to the other two layers. In the case of a capacitive acceleration transducer, the middle layer is displaced toward one of the other two layers by an acceleration having a vector component along a direction substantially perpendicular to the three layers. This displacement of the middle layer changes the capacitance between the layers, and the change in capacitance is used to measure the magnitude of the acceleration.

However, the substrate supporting the three overlying layers as well as the layers themselves can be deformed by mechanical, thermal, or intrinsic stresses and stress gradients. The deformation can affect many aspects of the transducer including the offset capacitance and the transducer sensitivity to acceleration. The offset capacitance is the capacitance between the layers when there is no acceleration. The transducer sensitivity is a measure of how much the capacitance changes in response to a given acceleration. A change in the offset capacitance or the transducer sensitivity can produce an error in the measurement of acceleration. Extra external circuitry can compensate for some of the changes in the offset capacitance or sensitivity, but the extra external circuitry increases the cost of the accelerometer. Also, the amount of compensation that can be provided by the extra external circuitry is limited.

Accordingly, a need exists for an electronic component for measuring acceleration wherein the electronic component is less sensitive to deformation of the underlying support substrate and of the overlying layers themselves.

BRIEF DESCRIPTION OF THE DRAWINGS

For simplicity and clarity of illustration, elements in the drawings are not necessarily drawn to scale, and the same reference numerals in different figures denote the same elements.

DETAILED DESCRIPTION OF THE DRAWINGS

Figure 1:
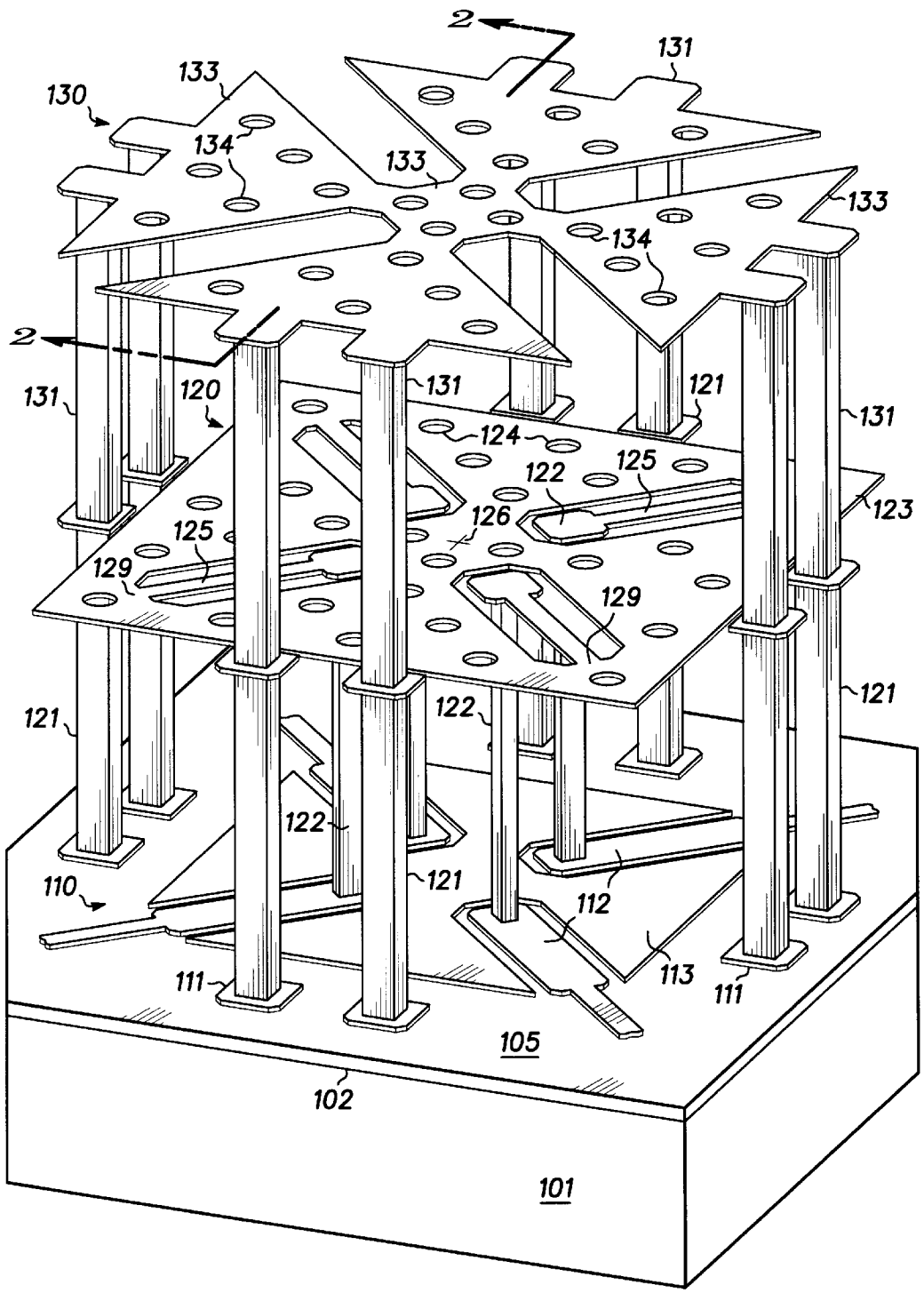
FIG. 1 illustrates a stretched isometric view of a portion of an embodiment of an electronic component in accordance with the present invention.

FIG. 1 illustrates a stretched isometric view of a portion of an electronic component 100. Component 100 is a sensor capable of measuring acceleration. In particular, component 100 is preferably a differential capacitive accelerometer having three parallel sensing portions or electrodes 113, 123, and 133 that are vertically separated from each other in a direction substantially perpendicular to a surface 102 of an underlying substrate 101. Other portions of component 100 are described in detail hereinafter. Electrodes 113 and 133 are substantially fixed or immobile relative to each other. Electrode 123 is located between electrodes 113 and 133, and electrode 123 is not fixed or is movable relative to electrodes 113 and 133. In this embodiment, component 100 includes two capacitances: a first capacitance between electrodes 113 and 123 and a second capacitance between electrodes 123 and 133. Electrodes 113, 123, and 133 are each formed by single, physically continuous electrodes and are not each formed by a plurality of discrete, isolated, or non-contiguous electrode portions. Thus, the first and second capacitances are each formed by a single, physically continuous capacitive area and are not formed by a plurality of discrete, isolated, or non-contiguous capacitive areas.

Electrodes 113, 123, and 133 form a differential capacitor pair accelerometer having an axis of sensitivity that is substantially perpendicular to electrodes 113, 123, and 133, and to top surface 102 of substrate 101. When component 100 is not subjected to an acceleration having a vector component along the axis of sensitivity, the capacitance between electrodes 113 and 123 and the capacitance between electrodes 113 and 123 are preferably equal to each other. However, when component 100 is subjected to an acceleration having a vector component along the axis of sensitivity, movable electrode 123 can be displaced towards fixed electrode 113 and away from fixed electrode 133 or vice versa. Therefore, the acceleration alters or changes the two capacitances to be unequal to each other. In particular, the capacitance between electrodes 113 and 123 becomes larger, and the capacitance between electrodes 123 and 133 becomes smaller or vice versa. This difference in the two capacitances is used to determine the direction and magnitude of the acceleration along the axis of sensitivity.

Figure 2:
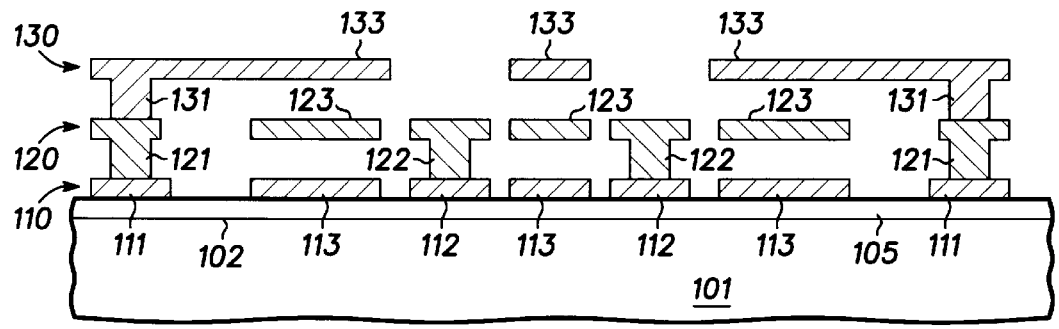
FIGS. 2 and 3 illustrate cross-sectional views of the electronic component of FIG. 1 during manufacturing and taken along a section line 2—2 in FIG. 1 in accordance with the present invention.
Figure 3:
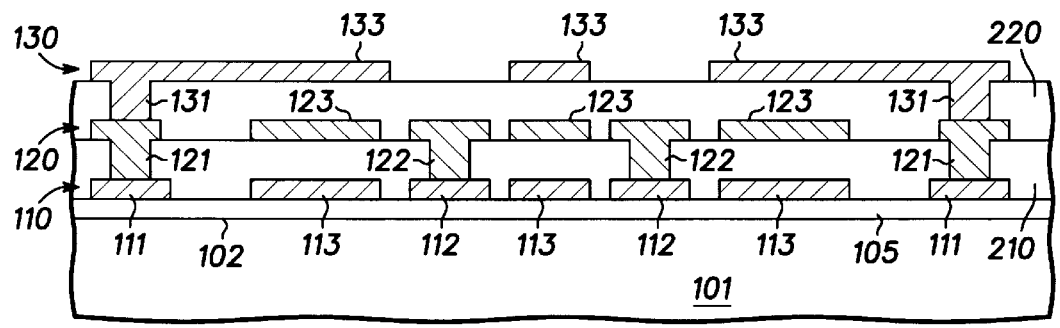

FIG. 2 illustrates a cross-sectional view of component 100 taken along a section line 2—2 in FIG. 1. FIG. 3 illustrates a similar cross-sectional view of component 100, but FIG. 3 illustrates component 100 during an earlier stage of the manufacturing process as compared to the illustration in FIG. 2.

In FIG. 3, component 100 includes, among other features, a substrate 101 having a top surface 102 for supporting three electrodes 113, 123, and 133 that are substantially parallel to each other. As an example, substrate 101 can be comprised of a monocrystalline silicon substrate.

Component 100 also includes a dielectric layer 105 overlying surface 102 of substrate 101. As an example, layer 105 can be comprised of silicon dioxide, silicon nitride, or the like. Layer 105 can also be a composite layer comprised of a plurality of oxide and nitride layers. Layer 105 can be disposed, generated, or deposited over surface 102 using chemical vapor deposition, thermal growth, or other techniques known in the art.

An electrically conductive layer 110 overlies layer 105 and surface 102 of substrate 101. Layer 105 electrically isolates layer 110 from substrate 101. Layer 110 is comprised of many parts, including anchors 111 and 112 and electrode 113. Anchors 111 and 112 are coupled to substrate 101 and, as explained later, help to support electrodes 133 and 123, respectively, over substrate 101. Electrode 113 forms the bottom sensing portion of component 100, and is preferably substantially parallel to surface 102 of substrate 101, and is preferably fixed or immobile relative to substrate 101. As an example, layer 110 can be comprised of doped polycrystalline silicon or polysilicon, can be deposited using chemical vapor deposition or other commercially available techniques, and can be patterned using conventional etch masks and etchants.

Next, a dielectric layer 210 is deposited and patterned over layers 105 and 110 and surface 102 of substrate 101.

Layer 210 is a temporary or sacrificial layer that is subsequently removed from component 100. Layer 210 is comprised of a material that can be selectively etched over that of layers 105 and 110. As an example, if layer 105 is comprised of silicon nitride and if layer 110 is comprised of doped polysilicon, then layer 210 can be comprised of phosphosilicate glass. In this embodiment, layer 210 can be subsequently selectively removed using a wet etchant such as, for example, hydrofluoric acid.

An electrically conductive layer 120 overlies layers 105, 110, and 210 and surface 102 of substrate 101. For ease of manufacturing, layer 120 is preferably comprised of the same material as layer 110. Also similar to layer 110, layer 120 has many parts, including anchors 121 and 122 and movable electrode 123. Anchors 121 and 122 overlie and are coupled to anchors 111 and 112, respectively. Anchors 122 and 112 support electrode 123 over electrode 113 and substrate 101. Electrode 123 will subsequently become movable relative to electrode 113, other portions of layer 110, layer 105, and substrate 101. In particular, electrode 123 will become movable in a direction substantially perpendicular to surface 102 of substrate 101 in response to an acceleration force along the axis of sensitivity. This particular motion of electrode 123 classifies component 100 as a z-axis accelerometer. Electrodes 123 and 113 are electrically isolated from each other by the pattern of layers 110 and 120 and by layer 210. Similar to electrode 113, electrode 123 is also preferably substantially parallel to surface 102 of substrate 101.

As illustrated in FIG. 1, layer 120 also includes tethers, arms, or beams 125. Each one of beams 125 can be coupled to a different one of anchors 122, and each one of beams 125 can be coupled to different attachment portions or points 129 of electrode 123. Beams 125 and anchors 122 and 112 support or suspend electrode 123 above electrode 113 and substrate 101. Beams 125 are compliant or flexible and enable electrode 123 to move. Beams 125 extend from anchors 122 to the attachment portions in a direction away from geometric center 126 of electrode 133. This configuration of the anchors and beams for electrode 133 improves the stability and reduces the temperature dependency of component 100, as explained in more detail hereinafter.

Back to FIG. 3, a dielectric layer 220 is deposited and patterned over layers 105, 110, 120, and 210 and surface 102 of substrate 101. Layer 220 is another temporary or sacrificial layer that is subsequently removed from component 100. For ease of manufacturing, layer 220 is preferably comprised of a material similar to that of layer 210.

An electrically conductive layer 130 overlies layers 105, 110, 120, 210, and 220 and surface 102 of substrate 101. For ease of manufacturing, layer 130 is preferably comprised of the same material as layers 110 and 120. Also similar to layers 110 and 120, layer 130 has many parts, including anchors 131 and electrode 133. Anchors 131 overlie and are coupled to anchors 111 and 121. Anchors 111, 121, and 131 support electrode 133 over electrodes 123 and 113 and substrate 101. As explained earlier, electrode 133 is preferably substantially fixed or immobile relative to electrode 113 and substrate 101. Electrodes 123 and 133 are electrically isolated from each other by the pattern of layers 110, 120, and 130 and by layer 220. Similar to electrodes 113 and 123, electrode 133 is also preferably substantially parallel to surface 102 of substrate 101.

After patterning layer 130, layers 210 and 220 are selectively removed using, for example, the previously described wet etchant. FIG. 2 depicts component 100 after the removal of layers 210 and 220. In FIG. 1, holes 124 in electrode 123 and holes 134 in electrode 133 facilitate the removal of layers 210 and 220. Holes 124 and 134 are not illustrated in FIGS. 2 and 3 for visual clarity of FIGS. 2 and 3.

The position of anchors 112 and 122 and beams 125 for movable electrode 123 provides several advantages. For instance, the tilt stability of component 100 is improved by keeping a major portion of the capacitive sensing area between a geometric center 126 (FIG. 1) of electrode 123 and attachment points 129. Preferably, the major portion of the capacitive sensing area is closer to geometric center 126 than attachment points 129. Attachment points 129 preferably form a mechanical moment arm that is longer than an average electrostatic moment arm of electrode 123. All moment arms are defined relative to geometric center 126 of electrode 123. The longer mechanical moment arm improves the stability of electrode 123 to tilt.

As another advantage, the close positions of anchors 112 relative to each other and anchors 122 relative to each other reduce the sensitivity of component 100 to bi-axial strain due to the expansion or compression of substrate 101. Moreover, component 100 is less sensitive to the temperature induced curvature of substrate 101 or layers 120 and 130 and to the mechanical stress induced curvature of substrate 101 by positioning anchors 112 and 122 appropriately within the outer perimeter of the capacitive sensing area of electrode 123. Substantially independent of the amount of substrate curvature, an appropriate position of anchors 112 and 122 maintains a balance of the capacitances between electrodes 113 and 123 and between electrodes 123 and 133. Moreover, placement of anchors 112 and 122 in an appropriate position will also make component 100 less sensitive to curvature of electrodes 123 and 133 due to, for example, stress gradients.

To optimize all of these advantages, several features are included in component 100. First, anchors 112 and 122 and beams 125 are preferably positioned within an outer perimeter of the capacitive sensing area of electrodes 113, 123, and 133. In general, the capacitive sensing area of electrodes 113, 123, and 133 are the portions of electrodes 113, 123, and 133 that preferably directly overlie or underlie each other and that determine the capacitances of component 100. The capacitive sensing area of electrode 123 is smaller than the entire area of electrode 123. For example, the capacitive sensing area of electrode 123 does not include the four corners of electrode 123 that are located between attachment points 129 and the outer perimeter of electrode 123. The capacitive sensing area of electrode 123 is defined by the portion of electrode 123 that overlies the capacitive sensing area of electrode 113 and that underlies the capacitive sensing area of electrode 133. The outer perimeter of the capacitive sensing area of electrode 123 is defined by the outer boundaries of electrode 123 and is preferably a convex polygon, thus encompassing or circumscribing anchors 122 and beams 125 in layer 120. The outer perimeters of the capacitive sensing areas of electrodes 113 and 133 are also preferably convex polygons, encompassing or circumscribing the holes cut out of electrodes 113 and 133 for the anchors and beams of movable electrode 123. In other words, the parallel plate capacitance between electrodes 113 and 123 is preferably defined by the portion of electrode 113 that directly underlies electrode 123, and the parallel plate capacitance between electrodes 123 and 133 is preferably defined by the portion of electrode 133 that directly overlaps or overlies electrode 123.

To further optimize the previously described advantages, all of anchors 122 preferably form the vertices or corners of a single convex polygon where a first portion of the capacitive sensing area is located outside of the convex polygon and where a second portion of the capacitive sensing area and geometric center 126 of electrode 123 is located inside the convex polygon. The convex polygon can be formed by drawing a straight line connecting adjacent ones of anchors 122 to form a closed polygon without crossing any of the drawn lines. In this convex polygon, the straight sides of the polygon do not intersect to form any angles pointing inward toward the center of the polygon. In other words, all of the internal angles of the polygon are less than one hundred eighty degrees. In the preferred embodiment, the convex polygon is also simply connected where there are no holes in the drawn polygon. In a simplified embodiment, the capacitive sensing area is located at both sides of a straight line drawn between two adjacent ones of anchors 122. Expressed in a different way, a side or segment of the polygon drawn between two adjacent anchors crosses over or passes through the capacitive sensing area. Preferably, each side of the polygon passes through the capacitive sensing area.

To optimize the advantages even further, a portion of the capacitive sensing area of electrode 123 is also preferably located within a convex polygon defined by attachment points 129. This convex polygon is also preferably simply connected. Attachment points 129 are preferably located towards the outer perimeter of electrode 123, but the exact location may vary. For example, attachment points 129 can be located inside or outside the outer perimeter of the capacitive sensing area of electrode 123. In a simplified embodiment, the capacitive sensing area is preferably located at both sides of a straight line drawn between two adjacent ones of attachment points 129. Expressed in a different way, a straight line of the polygon drawn between two adjacent attachment points preferably crosses over or passes through the capacitive sensing area. Preferably, each side of the polygon passes through the capacitive sensing area.

Figure 4:
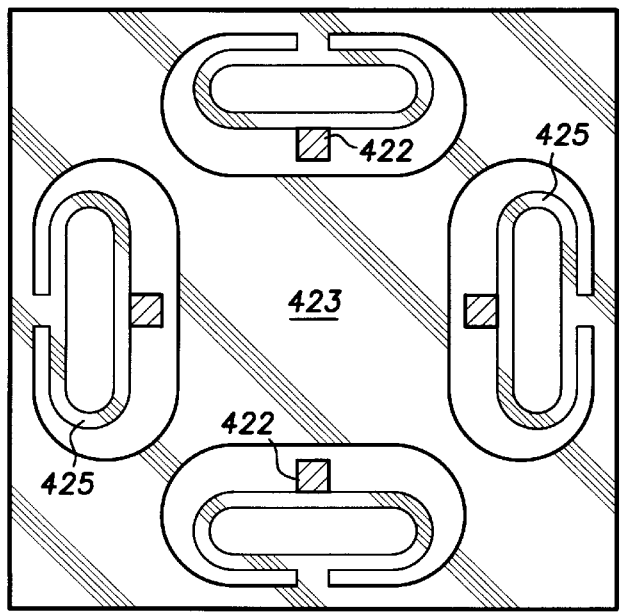
FIGS. 4, 5 and 6 illustrate top views of a portion of other embodiments of an electronic component in accordance with the present invention.

FIG. 4 illustrates a top view of a portion of a movable electrode or layer 420, which is a different embodiment of layer 120 of FIGS. 1, 2, and 3. However, layer 420 is preferably similar to layer 120 of FIGS. 1, 2, and 3. For example, layer 420 includes anchors 422, an electrode 423, and tethers, arms, or beams 425. However, beams 425 in layer 420 are each comprised of two symmetric folded elements or portions that can form a closed shape. Electrode 423 can have holes similar to holes 124 of electrode 123 in FIG. 1. However, the holes of electrode 423 are not illustrated in FIG. 4 for simplification.

Figure 5:
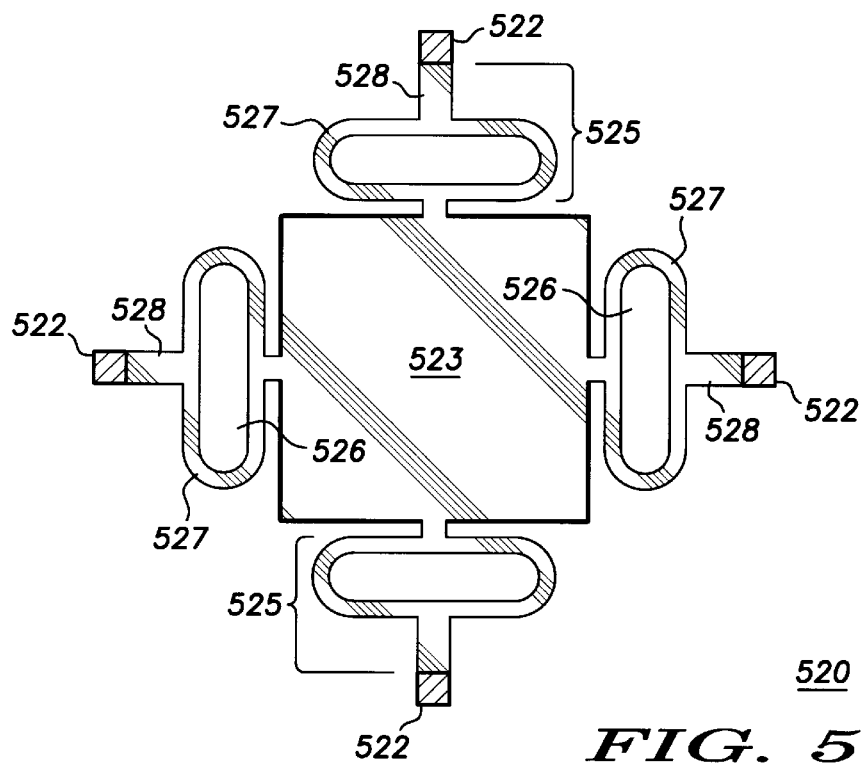

FIG. 5 illustrates a top view of a portion of a movable electrode or layer 520, which is a different embodiment from layer 120 of FIGS. 1, 2, and 3 and from layer 420 of FIG. 4. However, layer 520 is preferably similar to layer 120 of FIGS. 1, 2, and 3. For example, layer 520 includes anchors 522, an electrode 523, and tethers, arms, or beams 525. Electrode 523 can have holes similar to holes 124 of electrode 123 in FIG. 1. However, the holes of electrode 523 are not illustrated in FIG. 5 for simplification.

Anchors 522 and beams 525 are located outside of an outer perimeter of the capacitive sensing area of electrode 523. Furthermore, each of beams 525 have portions 527 and 528, where portion 528 is substantially more rigid than portion 527. For ease of manufacturing, the thickness of portions 527 and 528 is preferably substantially the same. Each of portions 527 are comprised of two symmetric folded elements or portions that can form a closed shape.

Rigid portion 528 is closer to anchor 522 than flexible or compliant portion 527. This configuration of beams 525 moves the effective position of anchors 522 closer towards the geometric center of electrode 523, and provides the advantages described hereinbefore. The concept of using rigid and flexible portions in a beam can also be applied to beams 425 in FIG. 4 and to beams 125 in FIG. 1.

Figure 6:
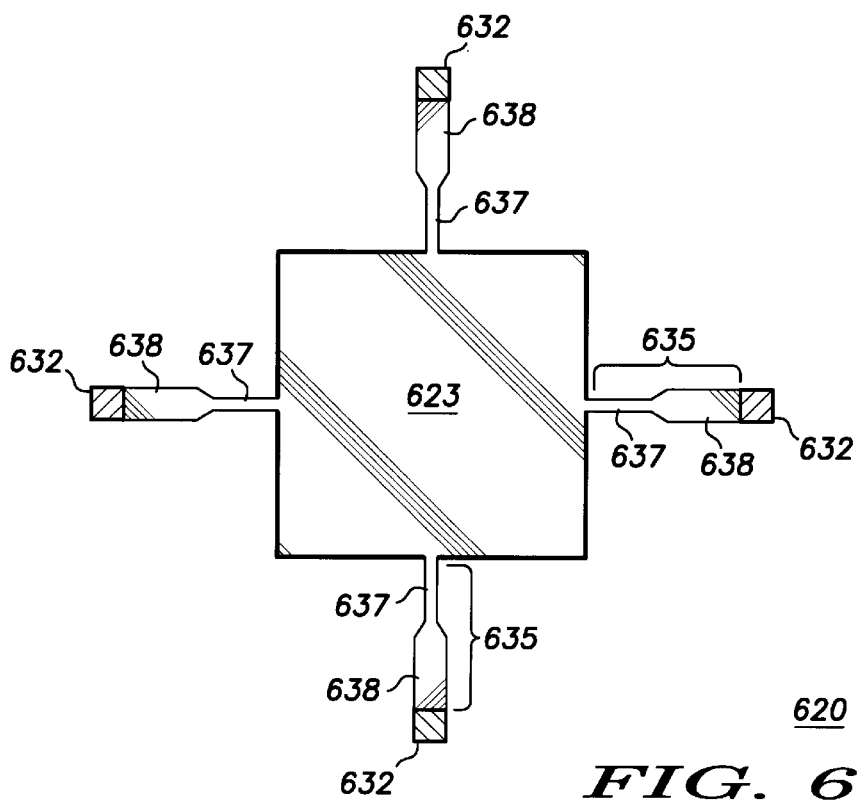

A plurality of beams 635 in FIG. 6 represent a different embodiment of beams 525. Beams 635 are located outside of an outer perimeter of the capacitive sensing area of electrode 623. Beam 635 has a portion 638 that is similar to portion 528 of beam 525, and beam 635 has a portion 637 that is comparable to portion 527 of beam 525. Portion 638 is substantially more rigid than portion 637.

Therefore, an improved electronic component is provided to overcome the disadvantages of the prior art. The component has anchors and beams, whose position and configuration reduce the component's sensitivity to tilt, substrate strain, and electrode layer curvature. The reduction of the sensitivity to these effects provides an electronic component that is more robust to manufacturing variations and that diminishes the need for extra circuitry to compensate for offset errors. The position of the anchors within an outer perimeter of the capacitive sensing area and the position of the capacitive sensing area within the convex polygons defined by the anchors allows for an efficient use of space and a smaller and cheaper electronic component. Therefore, the electronic component described herein can have a lower cost compared to the prior art because of the higher manufacturing yields and because of the elimination of the extra offset compensation circuitry without making the manufacturing process more complicated.

While the invention has been particularly shown and described mainly with reference to preferred embodiments, it will be understood by those skilled in the art that changes in form and detail may be made without departing from the spirit and scope of the invention. For instance, the numerous details set forth herein such as, for example, the specific material compositions and the exact configurations illustrated in the drawings are provided to facilitate the understanding of the present invention and are not provided to limit the scope of the invention. As an additional example, beams 125 can have bent, folded, or spiral configurations, instead of the straight line configuration illustrated in FIG. 1. As another example, a plurality of beams may be attached to each anchor. Furthermore, electrodes 113, 123, and 133 may be comprised of different, instead of the same, materials. Additionally, while four anchors are illustrated in the drawings, more or less than four anchors can also be used. Moreover, permanent dielectric layers can overlie or underlie electrodes 113, 123, or 133 to adjust the capacitance measured between adjacent electrodes, to increase the strength of the electrodes, or to reduce the flexibility of the electrodes. It is further understood that the concepts presented herein may be applied to other types of accelerometers and also to micromachined devices other than accelerometers. In yet another example, beam 535 in FIG. 5 can be used to replace beams 125 in FIG. 1 or beams 425 in FIG. 4.

Accordingly, the disclosure of the present invention is not intended to be limiting. Instead, the disclosure of the present invention is intended to be illustrative of the scope of the invention, which is set forth in the following claims.

What is claimed is:

1. An electronic component comprising:
   a support substrate having a surface;
   a first electrode overlying the surface of the support substrate;

a second electrode movable relative to the first electrode and separated from the first electrode in a direction substantially perpendicular to the surface of the support substrate, wherein the first and second electrodes form a capacitor with a sensing area;

a plurality of anchors located within an outer perimeter of the sensing area wherein a straight line connecting two adjacent ones of the plurality of anchors passes through the sensing area and wherein the plurality of anchors are coupled to the second electrode to support the second electrode over the first electrode; and a plurality of beams coupling the plurality of anchors to a plurality of portions of the second electrode.

2. The electronic component of claim 1 wherein the first and second electrodes each consist of a single, physically continuous electrode.

3. The electronic component of claim 1 wherein all of the plurality of anchors form vertices of a single simply connected polygon having a plurality of sides, wherein a first portion of the sensing area is located outside of the single simply connected polygon and wherein a second portion of the sensing area is located inside of the single simply connect polygon.

4. The electronic component of claim 3 wherein the single simply connected polygon is convex.

5. The electronic component of claim 1 wherein the plurality of portions of the second electrode form vertices of a simply connected polygon and wherein a portion of the sensing area is located within the simply connected polygon.

6. The electronic component of claim 5 wherein the simply connected polygon has a plurality of sides defined by adjacent ones of the plurality of portions of the second electrode wherein at least one of the plurality of sides passes through the sensing area.

7. The electronic component of claim 6 wherein each of the plurality of sides passes through the sensing area.

8. The electronic component of claim 5 wherein the simply connected polygon is convex.

9. The electronic component of claim 1 wherein the plurality of beams extend from the plurality of anchors to the plurality of portions of the second electrode in a direction away from a geometric center of the second electrode.

10. The electronic component of claim 1 wherein the plurality of beams are located within the outer perimeter of the sensing area.

11. The electronic component of claim 10 wherein the plurality of portions of the second electrode are located outside of the outer perimeter of the sensing area.

12. The electronic component of claim 1 wherein the plurality of beams have a first portion and a second portion wherein the first portion is more rigid than the second portion.

13. A capacitive accelerometer comprising:

a silicon substrate having a surface;

a dielectric layer overlying the surface of the silicon substrate;

a first doped silicon layer overlying the dielectric layer and the surface of the silicon substrate;

a second doped silicon layer overlying the first doped silicon layer, the dielectric layer, and the surface of the silicon substrate;

a third doped silicon layer located between the first and second doped silicon layers, movable in a direction substantially perpendicular to the surface of the silicon substrate in response to acceleration of the capacitive accelerometer, and movable relative to the first and second doped silicon layers, the silicon substrate, and the dielectric layer, wherein the first and third doped silicon layers form a first capacitor with a first capacitive area, wherein the second and third doped silicon layers form a second capacitor with a second capacitive area, wherein the first and second capacitive areas are each formed by a single, continuous capacitive area, and wherein the first and second capacitors form a differential capacitor pair;

a plurality of anchors comprised of doped silicon, coupled to the silicon substrate, and located within an outer perimeter of the first and second capacitive areas, wherein plurality of anchors define vertices of a first simply connected polygon, and wherein portions of the first and second capacitive areas are located within the first simply connected polygon; and a plurality of tethers comprised of doped silicon and coupling the plurality of anchors to different attachment points of the third doped silicon layer, wherein the different attachment points are located closer than the plurality of anchors to the outer perimeter of the first and second capacitive areas, wherein the different attachment points define vertices of a second simply connected polygon and wherein portions of the first and second capacitive areas are located within the second simply connected polygon.

14. The capacitive accelerometer of claim 13 wherein the first and second simply connected polygons are convex.

15. The capacitive accelerometer of claim 13 wherein each of the different attachment points are located outside of the outer perimeter of the first and second capacitive areas.

16. The capacitive accelerometer of claim 13 wherein a side of the first simply connected polygon that connects two adjacent ones of the plurality of anchors passes through the first and second capacitive areas and wherein a side of the second simply connected polygon that connects two adjacent ones of the different attachment points passes through the first and second capacitive areas.

17. The capacitive accelerometer of claim 13 wherein each of the plurality of tethers comprises a flexible portion adjacent to a substantially more rigid portion.

* * * * *